(12) United States Patent
Gvili et al.

(10) Patent No.: US 10,997,205 B2
(45) Date of Patent: May 4, 2021

(54) DATA ORIGIN VERIFICATION

(71) Applicant: International Business Machines Corporation, Armonk, NY (US)

(72) Inventors: David Gvili, Holon (IL); Ilya Tkachevsky, Ashdod (IL)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 16/254,499

(22) Filed: Jan. 22, 2019

(65) Prior Publication Data

US 2020/0233876 A1    Jul. 23, 2020

(51) Int. Cl.
    *G06F 16/27*      (2019.01)
    *G06F 9/54*       (2006.01)
    *G06F 16/22*      (2019.01)

(52) U.S. Cl.
    CPC .............. *G06F 16/27* (2019.01); *G06F 9/54* (2013.01); *G06F 16/2237* (2019.01)

(58) Field of Classification Search
    CPC ......... G06F 16/27; G06F 16/2237; G06F 9/54
    See application file for complete search history.

(56) References Cited

U.S. PATENT DOCUMENTS

| | | | |
|---|---|---|---|
| 6,629,199 B1 | 9/2003 | Vishlitzky et al. | |
| 6,996,672 B2 | 2/2006 | Lubbers et al. | |
| 8,335,899 B1* | 12/2012 | Meiri | G06F 11/2076 711/162 |
| 9,052,831 B1* | 6/2015 | Stefani | G06F 3/0619 |
| 2017/0222842 A1* | 8/2017 | Si | H04L 27/2613 |

\* cited by examiner

*Primary Examiner* — Loc Tran

(74) *Attorney, Agent, or Firm* — Kunzler Bean & Adamson

(57) ABSTRACT

Methods and systems for data origin verification are provided. A system for providing data origin verification includes a data injection module that injects origin information into separate bodies in a plurality of bodies. The origin information identifies a body in the plurality of bodies into which the origin information was injected. Also, the system includes a read data module that reads origin information from one or more bodies in the plurality of bodies. Additionally, the system includes an origin identifier module that determines a body in the plurality of bodies where the read origin information originated based on origin information contained in the read data.

20 Claims, 7 Drawing Sheets

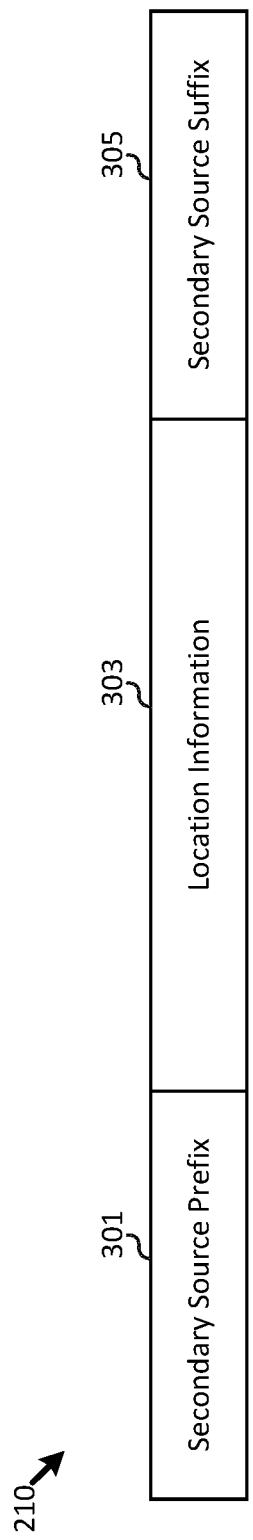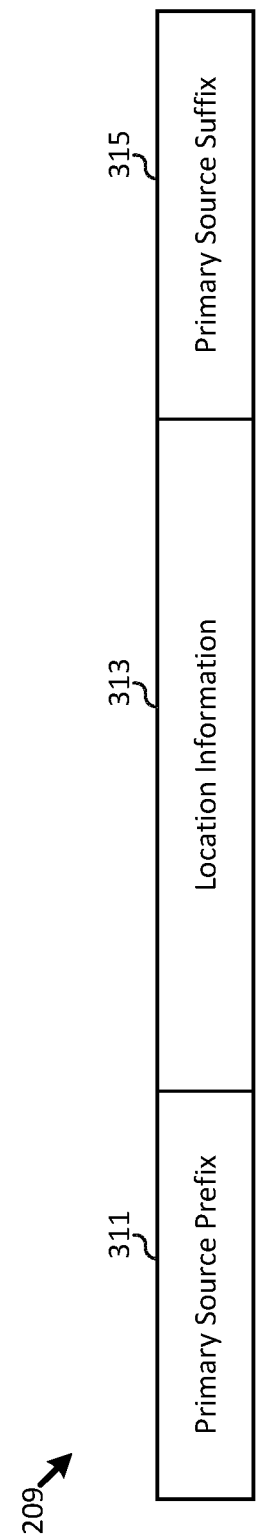
FIG. 3A
FIG. 3B

… …

DATA ORIGIN VERIFICATION

FIELD

This invention relates to system testing and more particularly relates to methods and systems for data origin verification.

BACKGROUND

High availability volumes may store data across two or more storage arrays. In some embodiments, the two or more storage arrays may be in an active/active configuration. When the two or more storage arrays are in an active/active configuration, the two or more storage arrays synchronize the data stored therein, such that the two or more storage arrays store the same data. Accordingly, a host device may read and/or write data to either the primary array or the secondary array.

SUMMARY

Methods and systems for data origin verification are provided. A system for providing data origin verification includes a data injection module that injects origin information into separate bodies in a plurality of bodies. The origin information identifies a body in the plurality of bodies into which the origin information was injected. Also, the system includes a read data module that reads origin information from one or more bodies in the plurality of bodies. Additionally, the system includes an origin identifier module that determines a body in the plurality of bodies where the read origin information originated based on origin information contained in the read data.

In certain embodiments, the body is a storage array in a stretched volume. Further, the origin information includes one or more origination markers and location information. Additionally, an origination marker in the one or more origination markers includes quantity origination prefix that precedes the location information and an origination suffix that follows the location information. Further, the location information indicates an offset within a storage array.

In some embodiments, the data injection module includes a body connectivity module that controls the inter-body communication channel through which information is communicated between the plurality of bodies. Additionally, the system includes a synchronization module that controls the synchronization of information stored on the plurality of bodies. The information is synchronized through the inter-body communication channel.

In further embodiments, the data injection module injects secondary origin information into a secondary body in the plurality of bodies. Additionally, the synchronization module directs the synchronization of secondary information on the secondary body with primary information stored on a primary body in the plurality of bodies. Further, the body connectivity module disconnects the inter-body communication channel between the primary body and the secondary body. Also, the data injection module injects primary origin information into the primary body. Moreover, the synchronization module clears synchronization indicators for the plurality of bodies. The synchronization indicators indicate the primary information is not synchronized with the secondary information. The body connectivity module also reconnects inter-body communication channel between the primary body and the secondary body. Additionally, a host sends a read request to the secondary body and the origin identifier module determines that the body handled the read request based on the read data.

One method includes injecting origin information into separate bodies in a plurality of bodies. The origin information identifies a body in the plurality of bodies into which the origin information was injected. Additionally, the method includes reading data from one or more bodies in the plurality of bodies. Further, the method includes determining a body in the plurality of bodies where the read data originated based on origin information contained in the read data.

In further embodiments, the body is a storage array in a stretched volume. Additionally, the origin information includes one or more origination markers and location information. Further, an origination marker in the one or more origination markers includes an origination prefix that precedes the location information and an origination suffix that follows the location information. The location information also indicates an offset within a storage array.

In some embodiments, the method includes controlling an inter-body communication channel through which information is communicated between the plurality of bodies. Also, the method includes controlling the synchronization of information stored on the plurality of bodies. The information is synchronized through the inter-body communication channel. Further, the method includes injecting secondary origin information into a secondary body in the plurality of bodies. The method also includes directing the synchronization of secondary information on the secondary body with primary information stored on a primary body in the plurality of bodies. The method additionally includes disconnecting the inter-body communication channel between the primary body and the secondary body. The method further includes injecting primary origin information into the primary body. Moreover, the method includes clearing synchronization indicators for the plurality of bodies. A synchronization indicator indicates that the primary information is not synchronized with the secondary information. Additionally, the method includes reconnecting the inter-body communication channel between the primary body and the secondary body. Further, the method includes sending a read request to the secondary body by a host. Also, the method includes determining that the body handled the read request based on the read data.

Also, disclosed are computer program products including a computer-readable storage medium that include program instructions embodied therewith for data origin verification. Some program instructions executable by a processor cause the processor to inject origin information into separate bodies in a plurality of bodies. The origin information identifies a body in the plurality of bodies into which the origin information was injected. Further, the program instructions cause the processor to read data from one or more bodies in the plurality of bodies. Also, the program instructions cause the processor to determine a body in the plurality of bodies where the read data originated based on origin information contained in the read data.

In certain embodiments, the program instructions cause the processor to inject secondary origin information into a secondary body in the plurality of bodies. Also, the program instructions cause the processor to direct the synchronization of secondary information stored on the secondary body with primary information stored on a primary body in the plurality of bodies. Further, the program instructions cause the processor to disconnect an inter-body communication channel between the primary body and the secondary body. Additionally, the program instructions cause the processor to inject primary origin information into the primary body. The program instructions also cause the processor to clear synchronization indicators for the plurality of bodies. A synchronization indicator indicates the primary information is not synchronized with the secondary information. The program instructions further cause the processor to reconnect the inter-body communication channel between the primary body and the secondary body.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3A is a block diagram illustrating embodiments secondary origin information;

FIG. 3B is a block diagram illustrating embodiments primary origin information;

DETAILED DESCRIPTION

Figure 1:
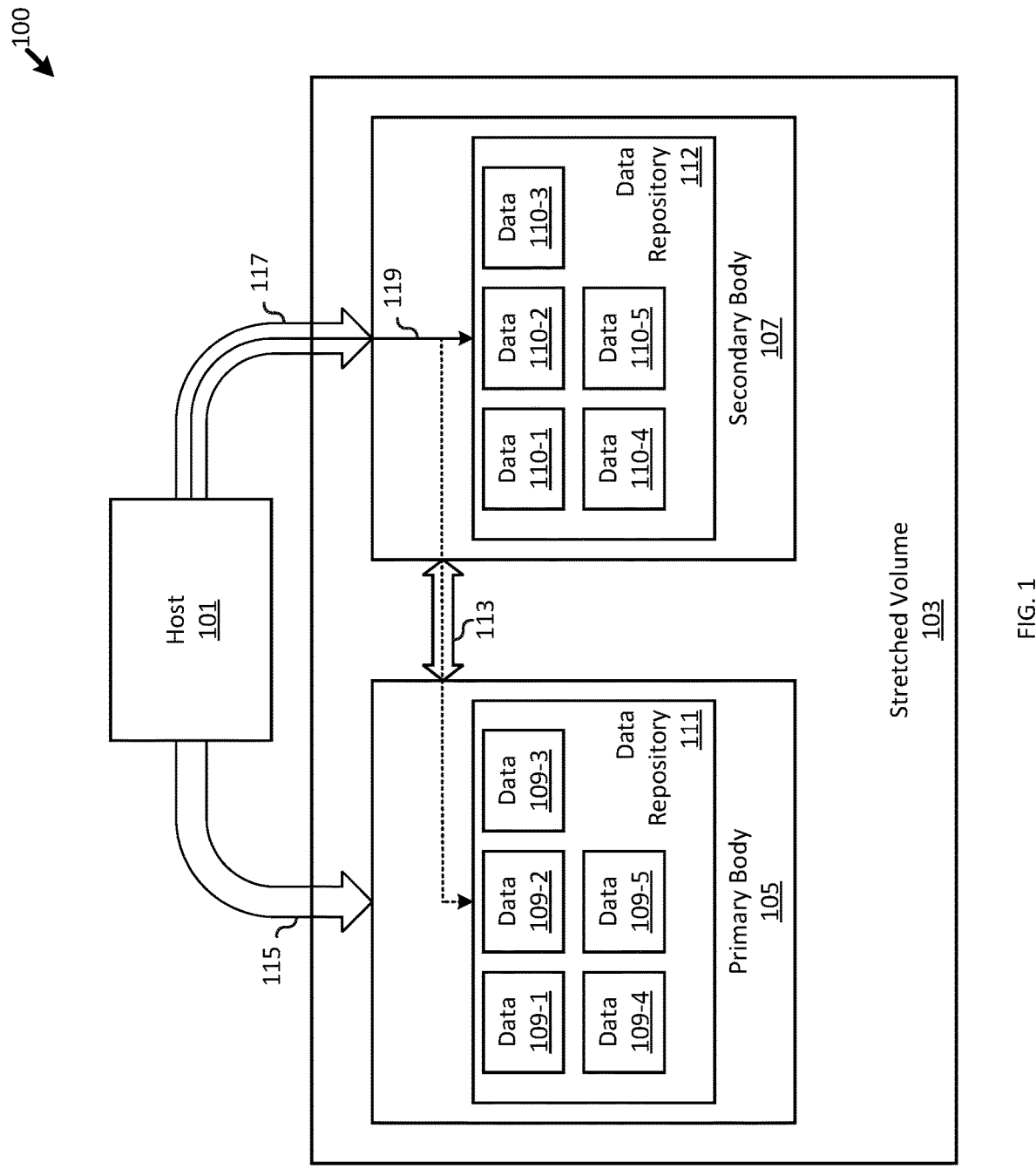
FIG. 1 is a block diagram of one embodiment of a computing system for maintaining a stretched volume.

Disclosed herein are various embodiments providing methods, systems, and computer program products that can provide data origin verification. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements.

With reference now to the figures, FIG. 1 is a block diagram of a system 100 for storing data in a volume 103.

As used herein, a volume 103 may refer to a logical disk that is presented to an attached host, such as the host 101. The volume 103 may be in one of multiple types of volume topologies. For example, the volume 103 may be in a standard topology at a single site. Also, the volume 103 may be in a HyperSwap topology. In certain embodiments, the volume 103 may be in a stretched topology. When the volume 103 is in a stretched topology, multiple copies are created on separate bodies located at separate sites for the system 100. Each of the separate bodies may maintain an active version of data that is simultaneously written to the separate bodies. Further, the body located at either site may provide access to the data if the other site become unavailable. A stretched topology may enable disaster recovery and high availability between different bodies at different locations.

In the illustrated embodiment, the volume 103 may include a primary body 105 and a secondary body 107. The primary body 105 may be located at a first site and the secondary body 107 may be located at a second site. The host 101 may access data stored on either of the primary body 105 or the secondary body 107. As used herein, a body, such as the primary body 105 and secondary body 107, may refer to an object capable of having data or information stored therein. For example, a body may be an electrical storage device. Alternatively, the body may be a location within an organic cellular body where groups of cells are located.

In some embodiments, the primary body 105 and the secondary body 107 may be in an active/active configuration. When the primary body 105 and the secondary body 107 are in an active/active configuration, data stored on the primary body 105 may be synchronized with the data stored on the secondary body 107 and vice versa. In further embodiments, the primary body 105 and the secondary body 107 may synchronize the data stored within the primary body 105 and the secondary body 107 by communicating through an inter-body communication channel 113. As used herein, the inter-body communication channel 113 may refer to a communication channel between multiple bodies, such as the primary body 105 and the secondary body 107. For example, the inter-body communication channel 113 may be a network connection, an internet connection, and the like.

In certain embodiments, the primary body 105 and the secondary body 107 may each include a data repository. For example, the primary body 105 may include a data repository 111 and the secondary body 107 may include a data repository 112. As used herein, a data repository, such as the data repository 111 and the data repository 112, may refer to a unit that is capable of storing data. For example, a data repository may be an electrical storage device, a cell, or group of cells, or other unit capable of storing data.

In some embodiments, when the data repository 111 and the data repository 112 are electrical storage devices. The data repository 111 and the data repository 112 may include any suitable type of storage device or cluster of storage devices that are known or developed in the future that can store computer-usable data. In various embodiments, the storage devices may include one or more non-transitory computer-usable mediums (e.g., readable, writable, etc.), which may include any non-transitory apparatus or device that can contain, store, communicate, propagate, and/or transport instructions, data, computer programs, software, code, routines, etc., for processing by or in connection with directions from a respective controlling electronic device, such as a processor or site controller for the sites containing the primary body 105 and the secondary body 107, a controller for the system 100, or a processor located at the host 101.

In certain embodiments, memory storage for the data repository 111 and the data repository 112 may be implemented as direct-access storage devices (DASD). The memory storage, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein.

In some embodiments, the storage devices may include a cluster of separate storage devices that are configured to store data. For example, the data repository 111 and the data repository 112 may be distributed on multiple separate storage devices that are part of a filesystem, where the filesystem may be a networked filesystem, a parallel filesystem, or other types of filesystem where multiple computing devices access the memory storage of the filesystem. In various embodiments, where the data repository 111 and the data repository 112 are storage devices, the data repository 111 and the data repository 112 may include non-volatile/persistent hardware and/or software configured to perform long-term data storage operations, including, but not limited to, data archiving, data backup, data mirroring, replicating data, etc. For instance, the storage devices may include non-volatile and/or persistent hardware and/or software to perform long-term data storage operations, which may include write operations, read operations, read-write operations, etc., among other operations.

In certain embodiments, a host 101 may respectively communicate with the primary body 105 and the secondary body 107 through the connections 115 and 117. The host 101 may direct what data is written to the primary body 105 and the secondary body 107 and may also control what data is read from the primary body 105 and the secondary body 107. For example, the host 101 may provide data to be written to the data repository 111 on the primary body 105 through the connection 115. When the primary body 105 receives information from the host 101 through the connection 115 to be written on the data repository 111, the primary body 105 may store the information as primary information. As illustrated, the primary information is shown as data 109. As illustrated, the data 109 may be segmented into different data portions represented as data 109-1-109-5. As used herein, the data 109-1-109-5 and the primary information may be collectively referred to as data 109. Data 109 may be data stored on the data repository 111.

In some embodiments, when data 109 is stored on the data repository 111, the primary body 105 communicates through the inter-body communication channel 113 with the secondary body 107 to synchronize the data 109 with the secondary information stored on the data repository 112. As illustrated, the secondary information is shown as data 110. In a similar manner to the data 109, the secondary information or data 110 may be segmented into different data portions represented as data 110-1-110-5. As used herein, the data 110-1-110-5 and the secondary information may be collectively referred to as data 110. As the data is synchronized between the primary body 105 and the secondary body 107, the data 109-1 may correspond to the data 110-1. Similarly, data 109-2-109-5 may respectively correspond to the data 110-2-110-5.

In additional embodiments, the host 101 may provide data to be written to the data repository 112 on the secondary body 107 through the connection 117. When the secondary body 107 receives data from the host 101 through the connection 117 to be written on the data repository 112, the secondary body 107 may divert the write request to the primary body 105 through the inter-body communication channel 113. Whereupon the redirected data may be stored as data 109. As described above, when the data 109 is stored on the data repository 111, the primary body 105 may communicate through the inter-body communication channel 113 with the secondary body 107 to synchronize the data 109 with the data 110 stored on the data repository 112. Alternatively, when the secondary body 107 receives data from the host 101 to the connection 117, the secondary body 107 may store the data as data 110 on the data repository 111. Thereafter, the secondary body 107 may synchronize the data 110 with the data 109 on the primary body 105.

In some embodiments, when the host 101 attempts to read data from the data repository 111 on the primary body 105 through the connection 115, the primary body 105 may provide the requested data from the data 109 stored on the data repository 111. Similarly, when the host 101 attempts to read data 110 from the data repository 112 on the secondary body 107 through the connection 117, the secondary body 107 may generally provide the requested data from the data 110 stored on the data repository 112. In some embodiments, the secondary body 107 may divert read requests 119 to the primary body 105 through the inter-body communication channel 113, where the primary body 105 may respond to the read request 119 using the data 109 stored on the data repository 111. For example, the secondary body 107 may divert read requests 119 to the primary body 105 when the secondary body 107 is experiencing a resynchronization or reservation configuration change.

In certain embodiments, as the data is synchronized between the primary body 105 and the secondary body 107, along with other bodies included in the volume 103, when the host 101 makes a read request 119 to the secondary body 107, it may be difficult for the host 101 or a verification system to determine whether the read request 119 was handled by the secondary body 107, diverted to the primary body 105, or some other body that is not illustrated in FIG. 1. Verification processes may call for the verification that the secondary body 107 diverts read request 119 to the primary body 105 in certain situations.

In some embodiments, to address challenges with verifying whether or not the secondary body 107 diverts read request 119 to the primary body 105, the host 101 may direct the volume 103 to stop communication through the inter-body communication channel 113, then apply a read request 119 to the secondary body 107. When the read request 119 is applied to the secondary body 107, the volume 103 may provide information to the host regarding monitored communications through the inter-body communication channel 113. If there is no traffic across the inter-body communication channel 113, then the host 101 may assume that the secondary body 107 did not divert the read request 119 to the primary body 105 and that the secondary body 107 was able to provide the data in response to the read request 119. However, this test is only able to verify that the secondary body 107 handled the read request 119 and is unable to verify that the secondary body 107 diverted the read request 119 to the primary body 105 when appropriate.

Additionally, to verify how the primary body 105 and the secondary body 107 respond to a read request 119 made to the secondary body 107, traffic analyzers may be placed that monitor the traffic through the various channels of communication in the system 100. For example, a first traffic analyzer may be placed on the connection 117 to monitor the traffic between the host 101 and the secondary body 107. A second traffic analyzer may be placed on the inter-body communication channel 113 to monitor the traffic between the primary body 105 and the secondary body 107. When the host 101 makes a read request 119 to the secondary body 107, the first and second traffic analyzers may record the traffic across the connection 117 and the inter-body communication channel 113. Subsequently, the recorded traffic information may be analyzed to determine if the secondary body 107 diverted read request 119 to the primary body 105 appropriately. While the use of traffic analyzers may provide a solution, the use of traffic analyzers is expensive. Also, the analysis of the recorded traffic information may take a burdensome amount of time.

In a further embodiment, the host 101 may record the amount of time used by the secondary body 107 to respond to a read request 119 from the host 101. Using the recorded time, the host 101 may determine whether the read request 119 was handled locally by the secondary body 107 or diverted to the primary body 105. For example, if the read request 119 was responded to quickly by the secondary body 107 (i.e. within a threshold time), then the host 101 may assume that the secondary body 107 handled the read request 119. Alternatively, if the read request 119 was responded to slowly by the secondary body 107 (i.e. over a threshold time), then the host 101 may assume that the secondary body 107 diverted the read request 119 to the primary body 105 due to the latency of the response. However, this method is inconclusive as responses from the secondary body 107 are prone to other latency changes that could lead the host 101 to arrive at the wrong conclusions. Accordingly, affordable and reliable methods for determining whether or not a secondary body 107 appropriately diverts read requests 119 to the primary body 105 are described herein.

Figure 2:
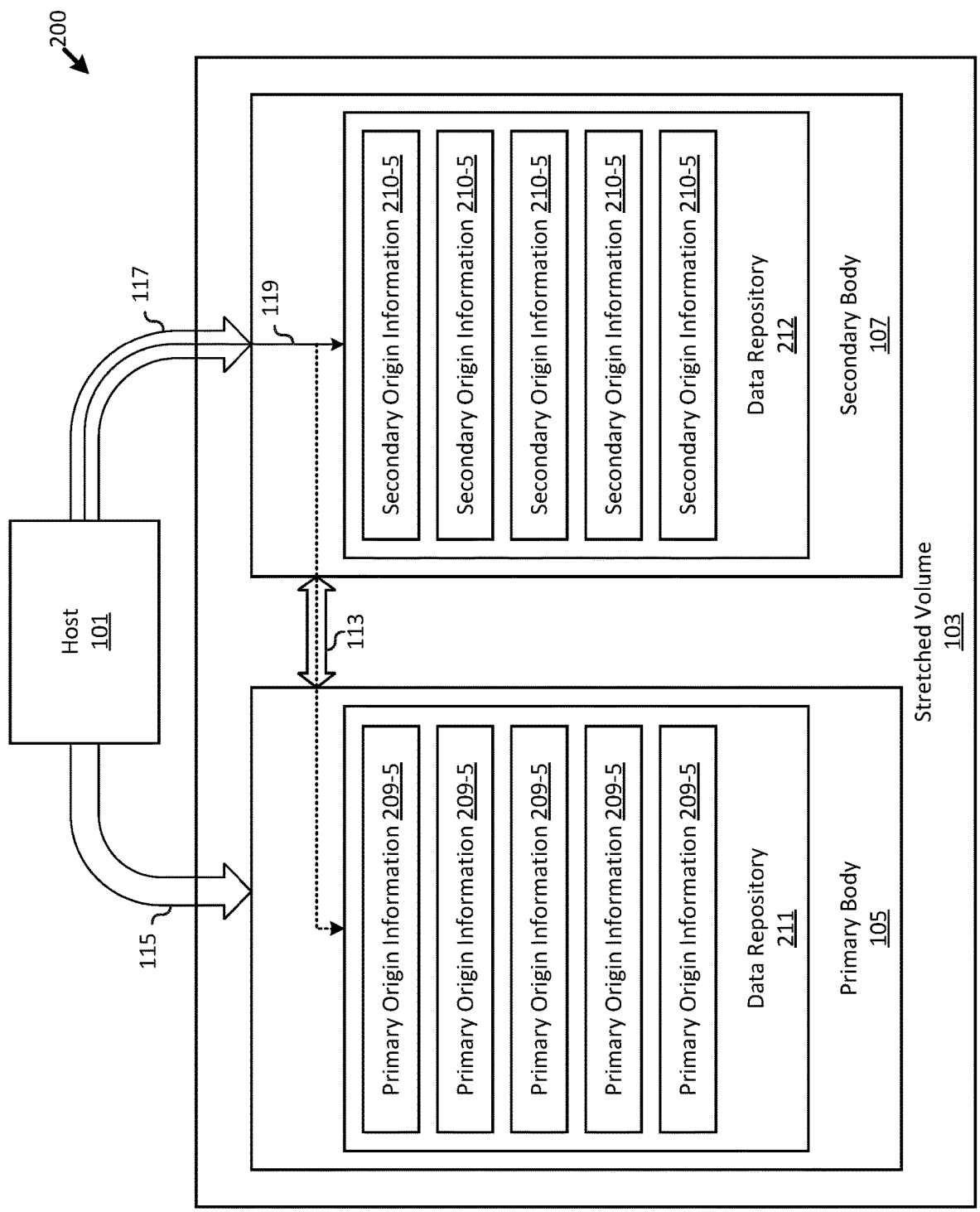
FIG. 2 is a block diagram of one embodiment of a computing system for maintaining a stretched volume with data origin verification.

FIG. 2 is a block diagram of a computing system 200 for maintaining a stretched volume 103 that implements data origin verification. As illustrated, the stretched volume 103, the host 101, the primary body 105, the secondary body 107, the inter-body communication channel 113, the connections 115 and 117, and the read request 119 to the secondary body 107 may be similar to corresponding items described above with respect to the system 100 in FIG. 1. Additionally, the data repository 211 and the data repository 212 may be respectively similar to the data repository 111 and the data repository 112 described above with respect to FIG. 1. However, the data repository 211 and the data repository 212 additionally store information that can aid in performing data origin verification.

In certain embodiments, to perform data origin verification, a host 101 (or a test administrating device) may perform a test that artificially creates a situation where the data repository 211 and the data repository 212 store distinct data. When the host 101 sends a read request 119 to the secondary body 107, the host 101 may be able to tell from the artificially created distinct data returned in response to the read request 119 whether the read request 119 was serviced by the secondary body 107 or redirected by the secondary body 107 to the primary body 105.

In some embodiments, prior to the performance of the test to verify that the secondary body 107 handles read requests 119 correctly, the host 101 may inject test data onto the data repository 211 and data repository 212. To inject the test data, the host 101 or other test administering device may write secondary origin information 210 on the data repository 212 and primary origin information 209 on the data repository 211. When the host 101 sends the read request 119 to the secondary body 107, if the host 101 receives primary origin information 209 in response to the read request 119, then the host 101 or other test administrator may determine that the read request 119 was diverted by the secondary body 107 to the primary body 105 through the inter-body communication channel 113. Alternatively, if the host 101 receives secondary origin information 210 in response to the read request 119, then the host 101 or other test administrator may determine that the read request 119 was handled by the secondary body 107. By artificially injecting primary origin information 209 into the primary body 105 and secondary origin information 210 onto the secondary body 107, the host 101 may verify whether or not the secondary body 107 handles read requests 119 from the host 101 as intended.

FIGS. 3A and 3B respectively illustrate possible embodiments of the secondary origin information 210 and the primary origin information 209. As illustrated, the secondary origin information 210 may include an origination marker. As used herein, an origination marker may refer to information that indicates the origination of the data. For example, the origination marker for the secondary origin information 210 may include a secondary source prefix 301 and a secondary source suffix 305. As used herein, the secondary source prefix 301 may be data that identifies the secondary body 107. For example, the secondary source prefix 301 may include a bit, a header, an identification number for the secondary body 107, or other information that distinguishes the secondary body 107 from the primary body 105. Similarly, the secondary source suffix 305 may be data that identifies secondary body 107. For example, the secondary source suffix 305 may be a copy of the information stored in the secondary source prefix 301. Alternatively, the secondary source suffix 305 and the secondary source prefix 301 may jointly or independently identify the secondary body 107. In other embodiments, the secondary origin information 210 may include one of the secondary source prefix 301 and the secondary source suffix 305. Also, the secondary origination marker may include other types of information other than the secondary source prefix 301 and the secondary source suffix 305 that can capably indicate the origination of the data. Further, the secondary origin information 210 may include location information 303. As used herein, the location information 303 may refer to the location of the secondary origin information 210 within the data repository 212. For example, the location information 303 may include a physical address within the data repository 212 or a logical address for storage within the data repository 212.

In similar embodiments, the primary origin information 209 illustrated in FIG. 3B may include a primary origination marker that may include the primary source prefix 311 and a primary source suffix 315. Also, the primary origin information 209 may include location information 313. Similarly, the primary source prefix 311 may be data that identifies the primary body 105. For example, the primary source prefix 311 may include a bit, a header, an identification number of the primary body 105, or other information that distinguishes the primary body 105 from the secondary body 107. Also, the primary source suffix 315 may identify the primary body 105. For example, the primary source suffix 315 may be a copy of the information stored in the primary source prefix 311. Alternatively, the primary source suffix 315 and the primary source prefix 311 may function together to identify the primary body 105 or the primary source suffix 315 and the primary source prefix 311 may independently identify the primary body 105. In other embodiments, the primary origin information 209 may include one of the primary source prefix 311 and the primary source suffix 315. Also, the primary origination marker may include other types of information other than the secondary source prefix 301 and the secondary source suffix 305 that can capably indicate the origination of the data. Further, as used herein, the location information 313 may refer to location of the primary origin information 209 within the data repository 211. For example, the location information 313 may include a physical or logical address for storage within the data repository 212.

Figure 4:
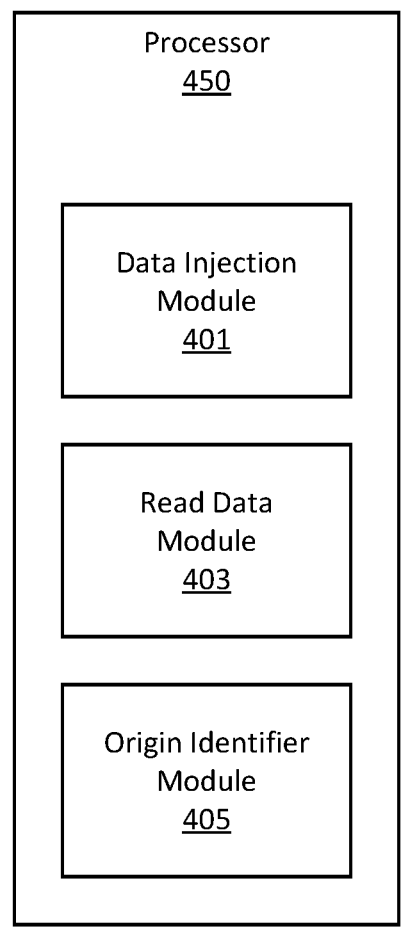
FIG. 4 is a block diagram illustrating an embodiment of a processor configured to provide data origin verification.

FIG. 4 is a block diagram illustrating an embodiment of a processor 450 for providing data origin verification. In certain embodiments, as used herein the processor 450 may be a general-purpose computer, special-purpose computer, multiple processors, or other programmable data processing apparatus. In some embodiments, the processor 450 may be located on the host 101, an independent testing apparatus, or other computing device that is capable of communicating with the primary body 105 and the secondary body 107 and injecting test data for storage in the data repository 211 and the data repository 212 as described above in connection with FIGS. 1 and 2. For example, the processor 450 may include a data injection module 401, a read data module 403, and an origin identifier module 405. As used herein, the data injection module 401 may inject origin information into separate bodies in a plurality of bodies. Further, as described herein, the read data module 403 may read data from one or more bodies in the plurality of bodies. Additionally, as described herein, the origin identifier module 405 may determine the body where the read data originated based on origin information contained in the read data.

In certain embodiments, the data injection module 401 may inject origin information onto separate bodies where the origin information identifies the body onto which the origin information is injected. For example, the data injection module 401 may inject origin information into different data repositories in a storage system. As described above with relation to FIG. 2, the data injection module 401 may store origin information into the data repository 211 and the data repository 212, where the origin information on the data repository 211 identifies the primary body 105 and the origin information on the data repository 212 identifies the secondary body 107. In an alternative embodiment, the data injection module 401 may inject origin information into other body types such as cells, where cellular matter containing information associated with the cell is injected into the cell.

In some embodiments, the origin information may include one or more identifiers for the body containing the origin information, as described above in relation to FIGS. 3A and 3B. Additionally, the origin information may identify the location of the data within the body. By inserting information that identifies locations within the body, the processor 450 may store a record of the locations within the body that have origin information stored therein.

In certain embodiments, the read data module 403 may read the data stored on the one or more bodies. For example, when the body is an electronic storage device, the read data module 403 may send a read request 119 to the secondary body 107. Upon reception of the read request 119, the secondary body 107 may either service the read request 119 locally or divert the read request 119 to the primary body 105. When the secondary body 107 services the read request 119 locally, the secondary body 107 may respond with the requested information. When the secondary body 107 diverts the read request 119 to the primary body 105, the primary body 105 may provide the requested data to the secondary body 107, whereupon the secondary body 107 provides the requested data to the read data module 403.

In additional embodiments, when the read data module 403 receives the requested information from the body that received the read request 119, the origin identifier module 405 may identify the body that serviced the read request 119. For example, the origin identifier module 405 may parse the received data to acquire identifiers stored in the acquired data. Based on the acquired identifiers, the origin identifier module 405 may identify the body that serviced the read request 119.

In some embodiments, the origin identifier module 405 may determine that an acquired identifier identifies the secondary body 107. When the acquired identifier identifies the secondary body 107, the origin identifier module 405 may determine that the secondary body 107 serviced the read request 119. Conversely, the origin identifier module 405 may determine that the acquired identifier identifies the primary body 105. When the acquired identifier identifies the primary body 105, the origin identifier module 405 may determine that the secondary body 107 diverted the read request 119 to the primary body 105. Accordingly, the acquired identifier may identify the body that handled the read request 119. Since the origin identifier module 405 is able to identify the body that handled the read request 119, the various modules in the processor 450 may function together to verify that the secondary body 107 appropriately handles read request 119 from the host 101.

Figure 5:
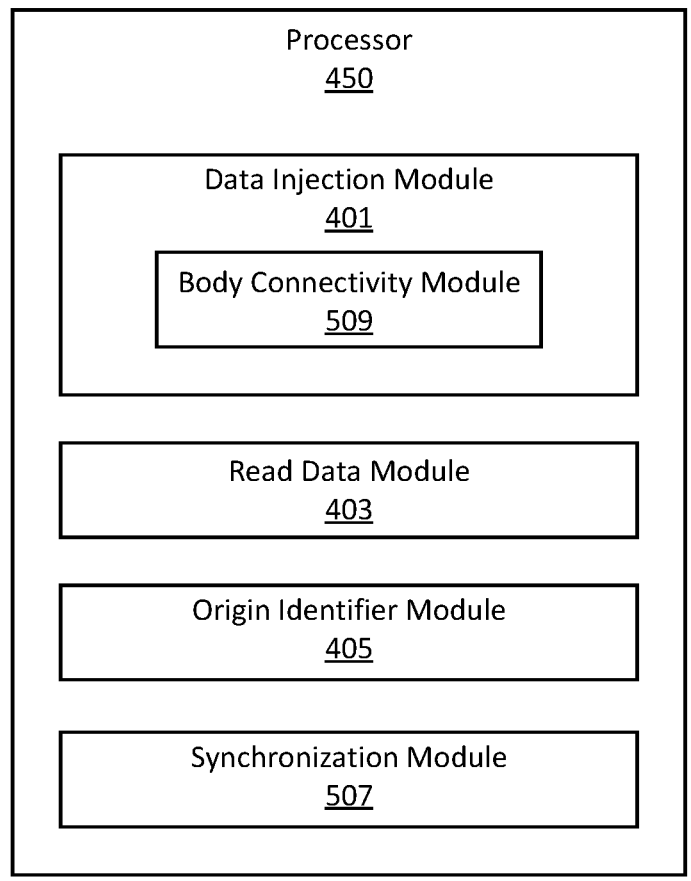
FIG. 5 is a block diagram illustrating a further embodiment of a processor configured to provide data origin verification.

FIG. 5 is a block diagram illustrating a further embodiment of a processor 450 for providing data origin verification. The processor 450, in various embodiments may be substantially similar to the processor 450 described above with regards to FIG. 4. In the depicted embodiment, the processor 450 may include a data injection module 401, a read data module 403, and an origin identifier module 405, which may be configured substantially similar as described above with regards to the data injection module 401, the read data module 403, and the origin identifier module 405 of FIG. 4. Additionally, the processor 450 may include a synchronization module 507. As described herein, the synchronization module 507 may control the synchronization of data stored on multiple bodies. Further, the data injection module 401 may include a body connectivity module 509 that controls an inter-body communication channel 113 between multiple bodies.

In certain embodiments, the body connectivity module 509 may control whether or not the primary body 105 is able to communicate with the secondary body 107. To control the communication between the primary body 105 and the secondary body 107, the body connectivity module 509 controls an inter-body communication channel 113. As described above in relation to FIGS. 1 and 2, the inter-body communication channel 113 is a channel through which the primary body 105 and the secondary body 107 communicate with one another. In certain embodiments, the body connectivity module 509 may disconnect the inter-body communication channel 113. Also, the body connectivity module 509 may connect a disconnected inter-body communication channel 113. In alternative embodiments, the body connectivity module 509 may cause the inter-body communication channel 113 to be in active. Further, the body connectivity module 509 may also deactivate certain functionality related to the inter-body communication channel 113. For example, the body connectivity module 509 may prevent the synchronization of data between the primary body 105 and the secondary body 107.

In some embodiments, the body connectivity module 509 may direct the disconnecting of the inter-body communication channel 113 during the data injection process controlled by the data injection module 401. For example, when the data injection module 401 is injecting origin information into the primary body 105 and the secondary body 107 to test whether or not the secondary body 107 handles read requests 119 appropriately, the body connectivity module 509 may direct the volume 103 to disconnect and reconnect the inter-body communication channel 113 between the primary body 105 and the secondary body 107. In particular, the data injection module 401 may initially inject secondary origin information 210 into the data repository 212 on the secondary body 107. When the secondary origin information 210 is injected, the body connectivity module 509 may direct the volume 103 to disconnect the inter-body communication channel 113. While the inter-body communication channel 113 is disconnected, the data injection module 401 may inject primary origin information 209 into the data repository 211 on the primary body 105. When the primary origin information 209 is injected, the body connectivity module 509 may reconnect the inter-body communication channel 113, where the primary body 105 and the secondary body 107 again communicate with one another.

In further embodiments, the synchronization module 507 may control the synchronization of the data 109 stored on the primary body 105 with the data 110 stored on the secondary body 107. For example, when information is stored on the secondary body 107, the synchronization module 507 may synchronize the information stored on the secondary body 107 with the information stored on the primary body 105 such that the information is stored on both the primary body 105 and the secondary body 107.

In additional embodiments, the synchronization module 507 may control flags that indicate whether data is synchronized between the primary body 105 and the secondary body 107. For example, if the host 101 stores data on the primary body 105, the synchronization module 507 may set a flag or other indicator that indicates that the data has not been synchronized with the data stored on the secondary body 107. When the synchronization module 507 synchronizes the data stored on the secondary body 107 with the data stored on the primary body 105, the synchronization module 507 may clear the flag that indicates whether the data stored on the primary body 105 and the secondary body 107 is synchronized.

In certain embodiments, the synchronization module 507 may direct the synchronization of the data between the primary body 105 and the secondary body 107 when the data injection module 401 injects secondary origin information 210 into the secondary body 107 before the body connectivity module 509 disconnects the inter-body communication channel 113, as described above. Further, after the body connectivity module 509 disconnects the inter-body communication channel 113, the data injection module 401 may inject primary origin information 209 into the primary body 105. As the inter-body communication channel 113 is disconnected, the synchronization module 507 may be unable to synchronize the data between the primary body 105 and the secondary body 107. Instead of synchronizing the data between the primary body 105 and the secondary body 107 after the body connectivity module 509 reconnects the inter-body communication channel 113, the synchronization module 507 may clear a flag or other indicator that data is yet to be synchronized between the primary body 105 and the secondary body 107. Accordingly, as the indications are cleared that would otherwise indicate that the data is not synchronized between the primary body 105 and the secondary body 107, when the body connectivity module 509 reconnects the inter-body communication channel 113, the synchronization module 507 may indicate that the data is synchronized between the primary body 105 and the secondary body 107. Thus, the primary origin information 209 may be stored on the primary body 105 and not on the secondary body 107.

In certain embodiments, when the read data module 403 provides a read request 119 to the secondary body 107 and the origin identifier module 405 determines that the read request 119 was responded to with data containing the primary origin information 209, then the origin identifier module 405 may determine that the read request 119 was diverted by the secondary body 107 and handled by the primary body 105. If the origin identifier module 405 determines that the read request 119 was responded to with data containing the secondary origin information 210, then the origin identifier module 405 may determine that the read request 119 was handled by the secondary body 107. Accordingly, by storing primary origin information 209 exclusively on the primary body 105 and storing secondary origin information 210 on the secondary body 107, a host 101 or other testing device may verify that the primary body 105 and the secondary body 107 handle read requests 119 appropriately.

Figure 6:
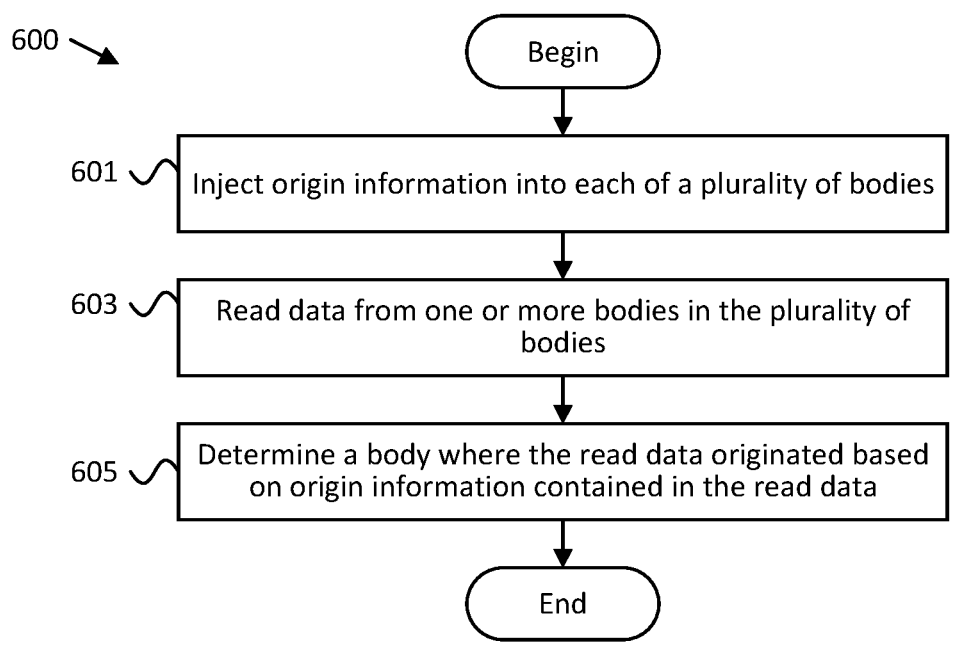
FIG. 6 is a flowchart diagram illustrating one embodiment of a method for providing data origin verification.

FIG. 6 is a flow diagram illustrating a method 600 for providing data origin verification. In certain embodiments, the method 600 proceeds at 601, where origin information is injected into each of a plurality of bodies. Further, the method 600 proceeds at 603, where data is read from one or more bodies in the plurality of bodies. Additionally, the method 600 proceeds at 605, where a body is determined where the read data originated based on origin information contained in the read data.

Figure 7:
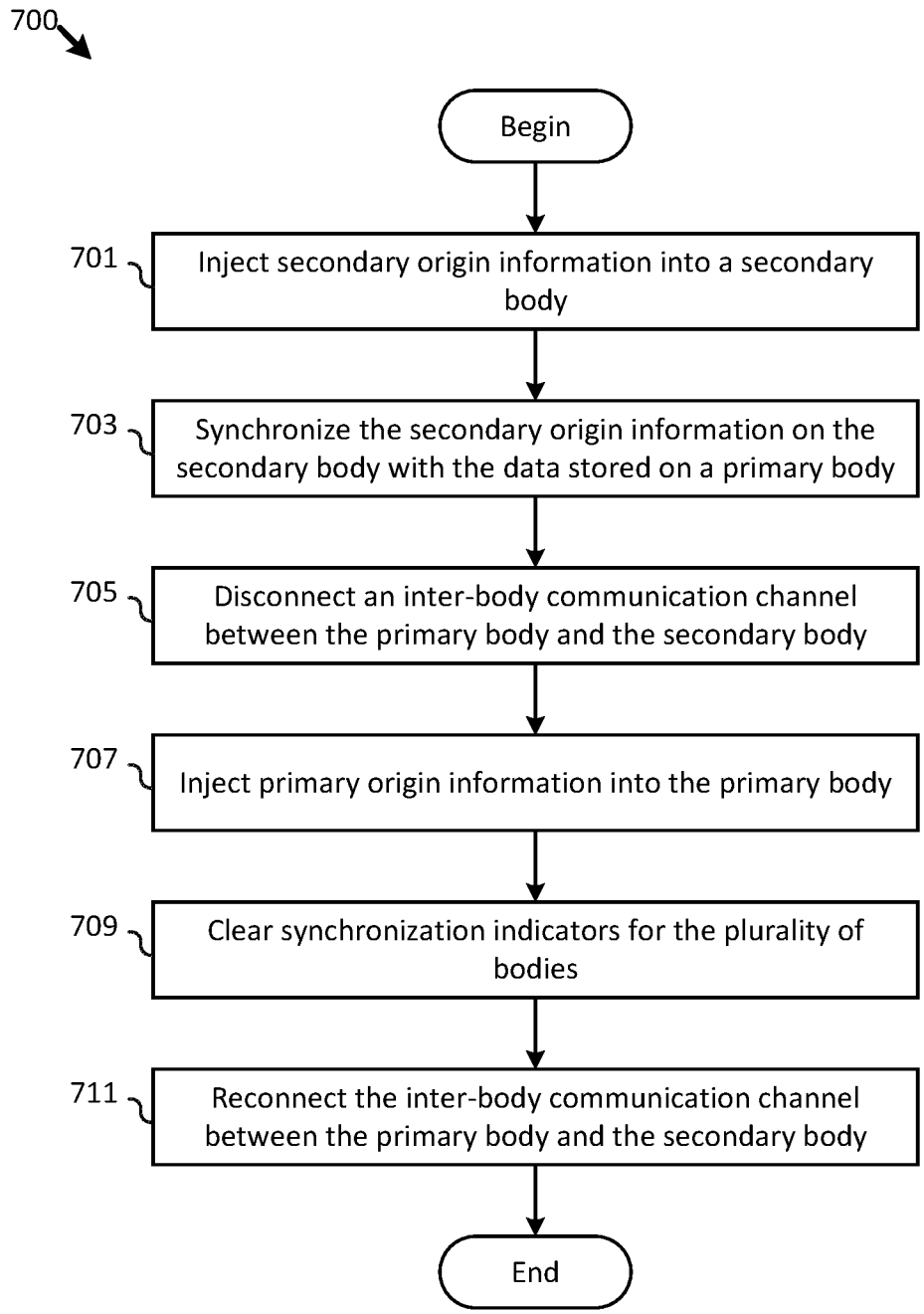
FIG. 7 is a flowchart diagram illustrating a further embodiment of a method for providing data origin verification.

FIG. 7 is a flow diagram illustrating an additional method 700 for providing data origin verification. In certain embodiments, the method 700 proceeds at 701 where secondary origin information 210 is injected into a secondary body 107. For example, a host 101 or other testing device may inject secondary origin information 210 into the data repository 212 stored on the secondary body 107. When the secondary origin information 210 is stored within the secondary body 107, the method 700 proceeds at 703 where the secondary origin information 210 on the secondary body 107 is synchronized with the data stored on a primary body 105. Accordingly, the secondary origin information 210 may be stored on both the secondary body 107 and the primary body 105.

In additional embodiments, when the secondary origin information 210 is stored on both the secondary body 107 and the primary body 105, the method 700 proceeds at 705 where an inter-body communication channel 113 is disconnected between the primary body 105 and the secondary body 107. For example, the primary body 105 and the secondary body 107 may communicate with one another through the inter-body communication channel 113. In particular, the data on the primary body 105 and the secondary body 107 may be synchronized via communications through the inter-body communication channel 113. Accordingly, the inter-body communication channel 113 may become disconnected or otherwise inactive to prevent the synchronization of data stored on the primary body 105 and the secondary body 107.

In further embodiments, when the inter-body communication channel 113 is disconnected between the primary body 105 and the secondary body 107, the method 700 proceeds at 707, where primary origin information 209 is injected into the primary body 105. For example, information that identifies the primary body 105 may be injected into the data repository 211 on the primary body 105. In contrast to the secondary origin information 210 injected into the secondary body 107, the primary origin information 209 may not be stored on the secondary body 107 due to the inter-body communication channel 113 being disconnected.

In some embodiments, when the primary origin information 209 is stored on the primary body 105, the method 700 may proceed at 709, where synchronization indicators are cleared for the plurality of bodies. For example, the primary body 105, the secondary body 107, or the host 101 may maintain a record, indicator, or other value that indicates whether or not data is stored on one of the primary body 105 or the secondary body 107 that is yet to be synchronized between the primary body 105 and the secondary body 107. To prevent the synchronization of the data stored on the primary body 105 and the secondary body 107 in the event that the inter-body communication channel 113 becomes reconnected, the synchronization indicator may be cleared such that the synchronization indicator shows to the computing system 100 that the data stored on the primary body 105 is synchronized with the data stored on the secondary body 107 even though the primary origin information 209 is stored on the primary body 105 and not the secondary body 107.

In certain embodiments, when synchronization indicators are cleared, the method 700 may proceed at 711, where the inter-body communication channel 113 between the primary body 105 and the secondary body 107 is reconnected. For example, when the inter-body communication channel 113 is reconnected, the primary body 105 and the secondary body 107 may attempt to synchronize the data stored on the primary body 105 and a secondary body 107. However, as the synchronization indicators show that the data is synchronized between the primary body 105 and the secondary body 107, the primary body 105 and the secondary body 107 will not attempt to further synchronize the data stored on the primary body 105 and the secondary body 107.

Accordingly, the host 101 or a testing device may send a read request 119 to the secondary body 107 requesting data associated with secondary origin information 210 or primary origin information 209. If the read request 119 requested the secondary origin information 210 and the secondary body 107 provides the secondary origin information 210, the host 101 or testing device may verify that the secondary body 107 locally handled the read request 119. Also, if the read request 119 requested the primary origin information 209 and the secondary body 107 provides the requested primary origin information 209, the host 101 or testing device may verify that the secondary body 107 diverted the read request 119 to the primary body 105 through the inter-body communication channel 113, where the primary body 105 handled the read request 119 and provided the requested data through the secondary body 107. Thus, by storing primary origin information 209 on the primary body 105 and secondary origin information 210 on the secondary body 107 in the manner described above in method 700, the origin of the data and proper operation of the primary body 105 and the secondary body 107 may be verified.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
a data injection module that:
injects origin information into separate bodies in a plurality of bodies, wherein the origin information identifies a body in the plurality of bodies into which the origin information was injected,
injects secondary origin information into a secondary body in the plurality of bodies, and
injects primary origin information into a primary body;
a read data module that reads data from one or more bodies in the plurality of bodies;
an origin identifier module that determines a body in the plurality of bodies where the read data originated based on origin information contained in the read data; and
a synchronization module that:
directs a synchronization of secondary information stored on the secondary body with primary information stored on the primary body in the plurality of bodies, and
clears synchronization indicators for the plurality of bodies, wherein a synchronization indicator indicates that primary information is not synchronized with the secondary information,
wherein:
the data injection module comprises a body connectivity module that:
disconnects an inter-body communication channel between a primary body and the secondary body prior to the primary origin information being injected into the primary body, and
reconnects the inter-body communication channel between the primary body and the secondary body after the synchronization indicators for the plurality of bodies are cleared, and
at least a portion of each of said modules comprises one or more of a set of hardware circuits, a set of programmable hardware devices, and executable code stored on a set of non-transitory computer-readable storage media.

2. The system of claim 1, wherein the body is a storage array in a stretched volume.

3. The system of claim 1, wherein the origin information comprises one or more origination markers and location information.

4. The system of claim 3, wherein an origination marker comprises an origination prefix that precedes the location information and an origination suffix that follows the location information.

5. The system of claim 3, wherein the location information indicates an offset within a storage array.

6. The system of claim 1, wherein the a body connectivity module controls the inter-body communication channel through which information is communicated between the plurality of bodies.

7. The system of claim 6, wherein the synchronization module controls the synchronization of information stored on the plurality of bodies, wherein the information is synchronized through the inter-body communication channel.

8. The system of claim 1, wherein a host sends a read request to the secondary body and the origin identifier module determines that the body handled the read request based on the read data.

9. A method comprising:
injecting origin information into separate bodies in a plurality of bodies, wherein the origin information identifies a body in the plurality of bodies into which the origin information was injected;
reading data from one or more bodies in the plurality of bodies;
determining a body in the plurality of bodies where the read data originated based on origin information contained in the read data;
injecting secondary origin information into a secondary body in the plurality of bodies;
directing the synchronization of secondary information stored on the secondary body with primary information stored on a primary body in the plurality of bodies;
disconnecting an inter-body communication channel between the primary body and the secondary body;
injecting primary origin information into the primary body;
clearing synchronization indicators for the plurality of bodies, wherein a synchronization indicator indicates that the primary information is not synchronized with the secondary information; and
reconnecting the inter-body communication channel between the primary body and the secondary body.

10. The method of claim 9, wherein the body is a storage array in a stretched volume.

11. The method of claim 9, wherein the origin information comprises one or more origination markers and location information.

12. The method of claim 11, wherein an origination marker comprises an origination prefix that precedes the location information and an origination suffix that follows the location information.

13. The method of claim 11, wherein the location information indicates an offset within a storage array.

14. The method of claim 9, further comprising controlling the inter-body communication channel through which information is communicated between the plurality of bodies.

15. The method of claim 14, further comprising controlling the synchronization of information stored on the plurality of bodies, wherein the information is synchronized through the inter-body communication channel.

16. The method of claim 9, further comprising:
sending a read request to the secondary body by a host; and
determining that the body handled the read request based on the read data.

17. A computer program product comprising a non-transitory computer-readable storage medium including program instructions embodied therewith, the program instructions executable by a processor to cause the processor to:
inject origin information into separate bodies in a plurality of bodies, wherein the origin information identifies a body in the plurality of bodies into which the origin information was injected;
read data from one or more bodies in the plurality of bodies;
determine a body in the plurality of bodies where the read data originated based on origin information contained in the read data;
inject secondary origin information into a secondary body in the plurality of bodies;

direct the synchronization of secondary information stored on the secondary body with primary information stored on a primary body in the plurality of bodies;

disconnect an inter-body communication channel between the primary body and the secondary body;

inject primary origin information into the primary body;

clear synchronization indicators for the plurality of bodies, wherein a synchronization indicator indicates that the primary information is not synchronized with the secondary information; and reconnect the inter-body communication channel between the primary body and the secondary body.

18. The computer program product of claim 17, wherein the program instructions further cause the processor to:

control the inter-body communication channel through which information is communicated between the plurality of bodies.

19. The computer program product of claim 18, wherein the program instructions further cause the processor to:

control the synchronization of information stored on the plurality of bodies, wherein the information is synchronized through the inter-body communication channel.

20. Computer program product of claim 17, wherein the origin information comprises one or more origination markers and location information.

* * * * *